(12) United States Patent
Rowland

(10) Patent No.: US 10,117,439 B1
(45) Date of Patent: Nov. 6, 2018

(54) CARCASS SUPPORT APPARATUS

(71) Applicant: Rick Rowland, Wetaskiwin (CA)

(72) Inventor: Rick Rowland, Wetaskiwin (CA)

( * ) Notice: Subject to any disclaimer, the term of this patent is extended or adjusted under 35 U.S.C. 154(b) by 0 days.

(21) Appl. No.: 15/882,034

(22) Filed: Jan. 29, 2018

Related U.S. Application Data

(60) Provisional application No. 62/464,415, filed on Feb. 28, 2017.

(51) Int. Cl.
*A22B 5/00* (2006.01)
*A22B 5/06* (2006.01)

(52) U.S. Cl.
CPC ...................... *A22B 5/06* (2013.01)

(58) Field of Classification Search
CPC ........... A22B 5/00; A22B 5/06; A22B 5/0017; A22B 5/0047; A22B 5/16; A22B 5/20
USPC .......................................... 452/185, 189–192
See application file for complete search history.

(56) References Cited

U.S. PATENT DOCUMENTS

| | | | | |
|---|---|---|---|---|
| 3,854,168 A * | 12/1974 | Bradley | ................ | A01M 31/00 248/514 |
| 5,607,143 A | 3/1997 | Regal | | |
| 6,062,974 A * | 5/2000 | Williams | ................. | A22B 5/06 452/187 |
| 6,695,688 B1 * | 2/2004 | Owen | ....................... | A22B 5/06 452/185 |
| 6,739,964 B2 * | 5/2004 | Gearhart | ................... | A22B 5/06 452/187 |
| 7,314,406 B2 * | 1/2008 | Bilinovich | ............... | A01K 5/00 452/185 |
| 7,341,507 B1 * | 3/2008 | Julian, Sr. | ................ | A22B 5/06 452/192 |
| 7,476,149 B2 * | 1/2009 | Burrows | ................... | A22B 5/06 452/187 |
| 7,544,120 B1 * | 6/2009 | Tardif | ................. | A01M 31/006 452/187 |
| D625,386 S * | 10/2010 | Missildine | .................... | D22/199 |
| 7,923,980 B2 * | 4/2011 | Takahashi | ............. | H02M 3/157 323/280 |
| 8,777,703 B1 * | 7/2014 | Herron | .................... | A22B 5/161 452/128 |
| 2008/0283334 A1 | 11/2008 | Fickey et al. | | |
| 2011/0260127 A1 | 10/2011 | Surgeon et al. | | |
| 2012/0007029 A1 | 1/2012 | Place | | |

* cited by examiner

*Primary Examiner* — Richard T Price, Jr.
(74) *Attorney, Agent, or Firm* — Cramer Patent & Design, PLLC; Aaron R. Cramer

(57) ABSTRACT

A game carcass support apparatus includes a tree jib plate securable to a tree, a truss plate securable to the tree superjacent to the tree jib plate, and a tree jib boom connected to the tree jib plate and connectable to the truss plate. A snatch block is connected to the tree jib boom. A lifting cable is operatively connected to the snatch block. A gambrel is connected to one end of the lifting cable. A carcass is mounted on the gambrel.

7 Claims, 4 Drawing Sheets

CARCASS SUPPORT APPARATUS

RELATED APPLICATIONS

The present invention claims the benefit of U.S. Provisional Application No. 62/464,415 filed on Feb. 28, 2017, the entire disclosures of which are incorporated herein by reference.

FIELD OF THE INVENTION

The present invention relates to carcass hoists and, more particularly, to a carcass hoist and support apparatus that is capable of being in mechanical communication with an electric winch or a towing vehicle.

BACKGROUND OF THE INVENTION

Over the years, modern advances in hunting equipment have enhanced the sport and provided hunters with increased success. Along with such success however, comes the task of field dressing the killed game. Traditionally, hunters have relied on gambrels that pierce the rear or front legs of the animal and are then hoisted in the air over a tree limb or other supporting structure during the field dressing operation. While such methods have been utilized for generations, they are often less than successful and require a great deal of physical strength when used with large animals such as moose or large deer. One of the biggest problems is finding a large enough tree with a lower branch at the proper height. This means that hunters will make do with whatever location is at hand, often placing them at risk for serious injury. Accordingly, there exists a need for a means by which large wild game can be field dressed in a safe and consistent manner.

SUMMARY OF THE INVENTION

The inventor has recognized the aforementioned, inherent problems and lack in the art and observed that there is a need for a new and improved large game carcass support aid. The development of the present invention, which will be described in greater detail herein, fulfills this need.

In an embodiment, the disclosed game carcass support apparatus includes a tree jib plate configured to be secured to a tree, a truss plate configured to be secured to the tree superjacent the tree jib plate, and a tree jib boom, having a distal end adjustably attached to the truss plate. The apparatus is capable of supporting a snatch block, a lifting cable, and a gambrel supporting a carcass thereon.

In another embodiment, the disclosed game carcass support apparatus includes a tree jib plate securable to a tree, a truss plate securable to the tree superjacent to the tree jib plate, and a tree jib boom connected to the tree jib plate and connectable to the truss plate. A snatch block is connected to the tree jib boom. A lifting cable is operatively connected to the snatch block. A gambrel is connected to one (1) end of the lifting cable. A carcass is mounted on the gambrel.

In an embodiment, the disclosed game carcass support apparatus includes a tree jib plate securable to a tree, a truss plate securable to the tree superjacent to the tree jib plate, a tree jib boom connected to the tree jib plate and connectable to truss plate, a snatch block connected to the tree jib boom, a lifting cable operatively connected to the snatch block, and a gambrel connected to one (1) end of the lifting cable. A carcass is mountable on the gambrel.

Furthermore, the features and advantages described herein may be combined in various manners and embodiments as one skilled in the relevant art will recognize. The embodiment and examples disclosed herein can be practiced without one (1) or more of the features and advantages described in a particular embodiment or example.

Further advantages of the embodiments and examples disclosed herein will become apparent from a consideration of the drawings and ensuing description.

BRIEF DESCRIPTION OF THE DRAWINGS

The advantages and features of the embodiments and examples disclosed herein will become better understood with reference to the following more detailed description and claims taken in conjunction with the accompanying drawings, in which like elements are identified with like symbols, and in which:

Figure 1:
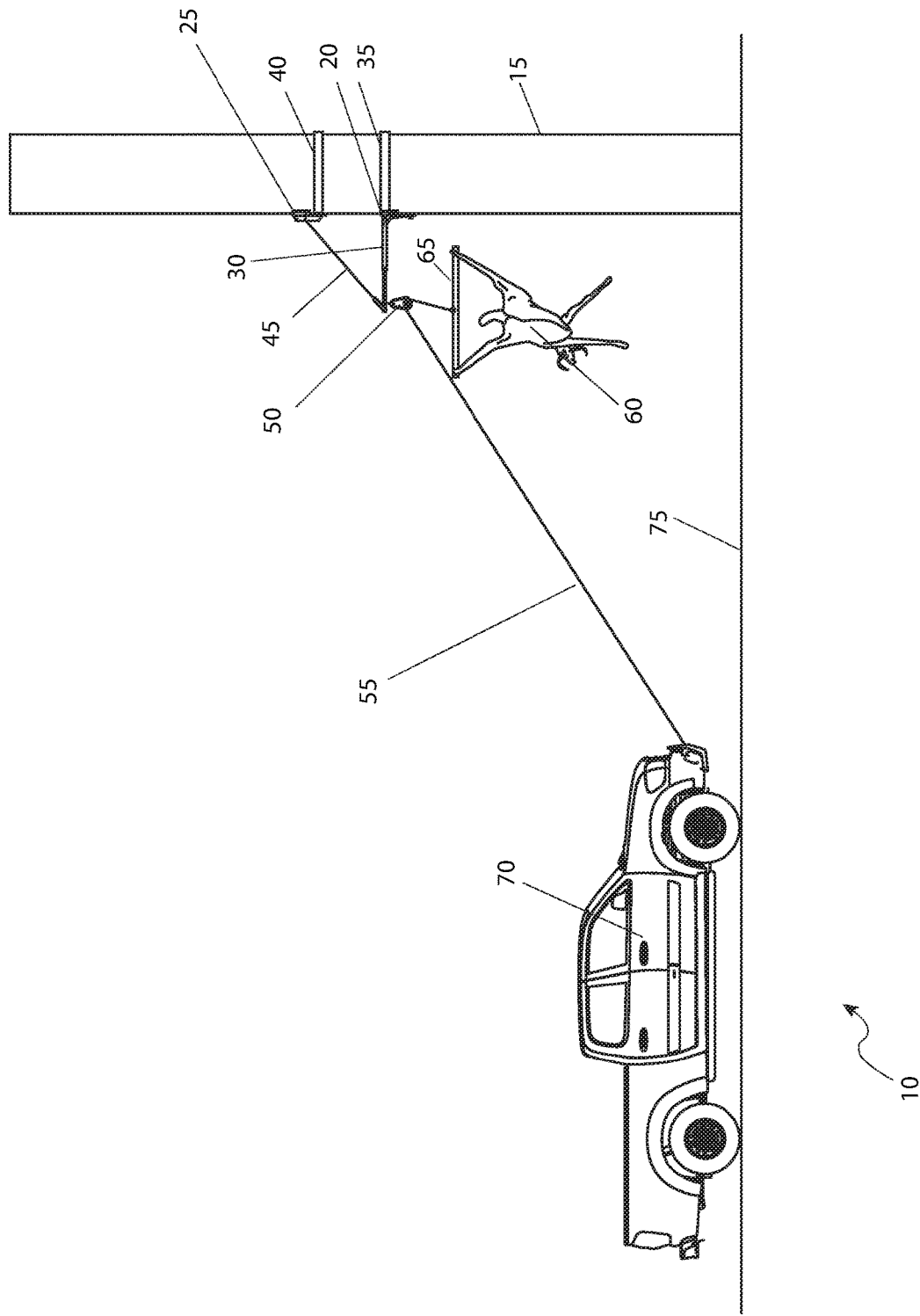
FIG. 1 is an environmental, perspective view of a disclosed large game carcass support aid, shown in a utilized state, according to an embodiment of the present invention.

DESCRIPTIVE KEY 10 game carcass support apparatus ("apparatus")
15 tree
20 tree jib plate
25 truss plate
30 tree jib boom
35 tree jib plate ratchet strap
40 truss plate ratchet strap
45 tree jib boom support ratchet strap
50 snatch block
55 lifting cable
60 large game animal
65 gambrel
70 powered lifting device
75 grade
80 main base plate
85 main base bolt tab
90 hole
95 nut
100 adjustment bolt
105 first temporary attachment hole
110 base boom
115 first strap anchor
120 bolt gusset
125 bolt tab gusset
130 tree jib plate ratchet strap attachment holes
135 main truss plate
140 truss support tab
145 bolt tab gusset 150 second strap anchor
155 second temporary attachment hole
160 truss plate ratchet strap attachment hole
165 boom extension
170 first connection hole
175 second connection hole
180 third connection hole

DETAILED DESCRIPTION OF THE PREFERRED EMBODIMENT

In accordance with the invention, the best mode is presented in terms of the illustrative example embodiments, herein depicted within FIGS. 1-4. However, the disclosure is not limited to a single described embodiment and a person skilled in the art will appreciate that many other embodiments are possible without deviating from the basic concept of the disclosure and that any such work around will also fall under its scope. It is envisioned that other styles and configurations can be easily incorporated into the teachings of the present disclosure, and only one (1) particular configuration may be shown and described for purposes of clarity and disclosure and not by way of limitation of scope.

As used herein, the singular terms "a," "an," and "the" include plural referents unless the context clearly dictates otherwise. Thus, for example, reference to an object can include multiple objects unless the context clearly dictates otherwise.

As used herein, the terms "connect," "connected," and "connection" refer to a coupling or linking. Connected objects can be directly coupled to one (1) another or can be indirectly coupled to one (1) another, such as via another object.

As used herein, the terms "first," "second," etc. are used merely as labels and do not impose any positional or hierarchical requirements on the item to which the term refers.

Referring generally to FIGS. 1-4, disclosed is a large game carcass hoist and support aid, generally referred to herein as the apparatus, 10 where like reference numerals represent similar or like parts. Generally, the apparatus 10 assists in field dressing of large game animals, such as moose, caribou, large deer, and the like. In an example, the animal can be lifted high into the air using a conventional gambrel along with either an electric winch, a vehicle assist lift, a block and tackle system, or similar device for field dressing and subsequent loading onto a wheeled device for transport. In an example implantation of use, the apparatus 10 is utilized on a tree 15 (FIG. 1), for example, being at least twelve inches (12 in.) but no more than sixteen inches (16 in.) in diameter to ensure that the necessary weight can be safely lifted without damage to the tree 15.

Referring to FIG. 1, in an example, the apparatus 10 includes a tree jib plate 20, a truss plate 25, and a tree jib boom 30. During use, the tree jib plate 20 is physically attached to the tree 15 by a tree jib plate ratchet strap 35 and the truss plate 25 is physically attached to the tree 15 by a truss plate ratchet strap 40. The distal end of the tree jib boom 30 is supported by a tree jib boom support ratchet strap 45 that is attached to the truss plate 25.

In various examples, the tree jib plate ratchet strap 35, the truss plate ratchet strap 40, and the tree jib boom support ratchet strap 45 are of a conventional design and have a rating of at least twenty-two hundred pounds (2200 lbs).

In an example, a snatch block 50, of conventional design and having a rating of one ton (1 T), is utilized with a lifting cable 55 to perform the lifting operation of the carcass 60.

In an example, the snatch block 50 is utilized with a hanging scale (not shown), such as a Roughneck™ Digital Hanging Scale 1100 Lb. Capacity (Item #34626), which is commercially available from Northern Tool+Equipment Co., Inc. of Minnesota, USA, or another analog or digital hanging scale. The hanging scale verifies the load limit of the apparatus 10. In an example, the digital scale is located at the end of the lifting cable 55 adjacent to or on the gambrel 65. In another example, the hanging scale is attached to a connection hole (e.g., a second connection hole 175 (FIG. 4) of the tree jib boom 30 either concurrently with or directly on the snatch block 50.

In an example implementation of use, the carcass of the large game animal 60 is secured to the gambrel 65 (e.g., in a conventional manner) and is lifted relative to grade 75 with the aid of a power lifting device 70, such as a vehicle, an electric winch, a block and tackle system, a come-along, or similar device. The large game animal 60 is lifted a certain distance that is optimum for performing field dressing operations and can then be further lifted to allow for a transport mechanism, such as a truck, trailer, game cart, and the like, to be positioned under the large game animal 60 to allow for lowering of the large game animal 60 safely onto the transport mechanism.

The exact positioning of the apparatus 10 on the tree 15 may vary per the size of the large game animal 60. In an example, the tree jib plate 20 is located approximately fourteen feet (14 ft.) above the grade 75 and the truss plate 25 is located approximately three feet (3 ft.) higher that the tree jib plate 20. It is envisioned that the apparatus 10 may be used to safely lift large game animal 60 weighing up to twelve hundred pounds (1200 lbs) in a safe and controlled manner.

Figure 2A:
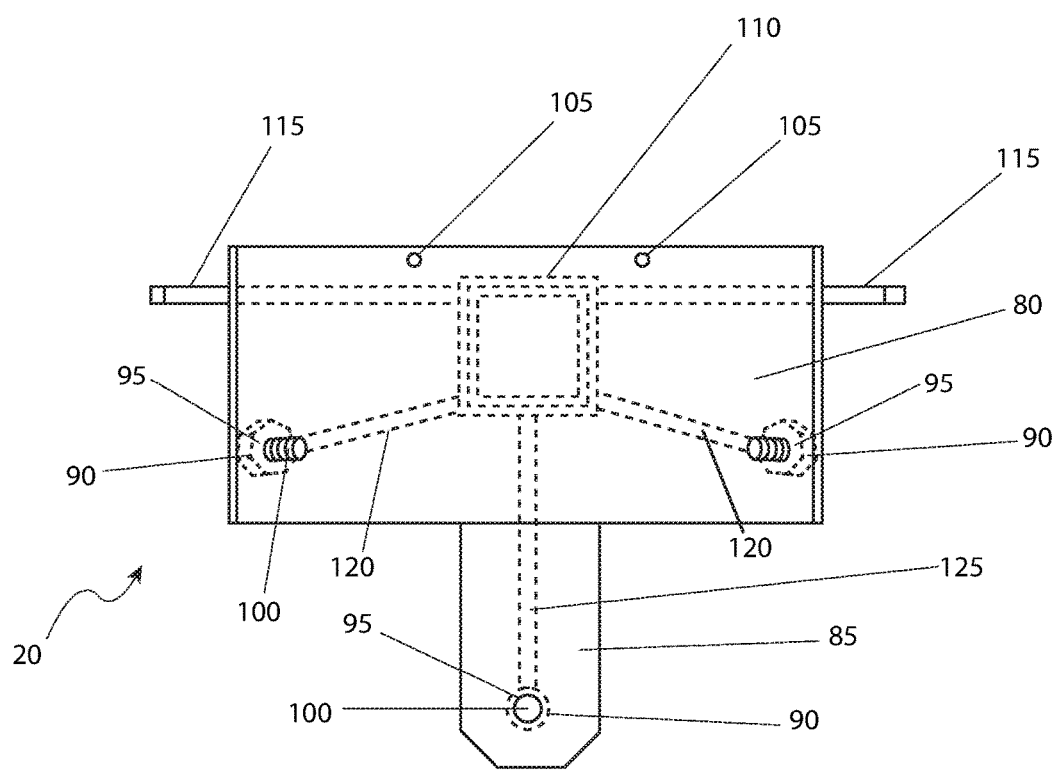
FIG. 2a is a front view of a tree jib plate of the disclosed large game carcass support aid, according to an embodiment of the present invention.
Figure 2B:
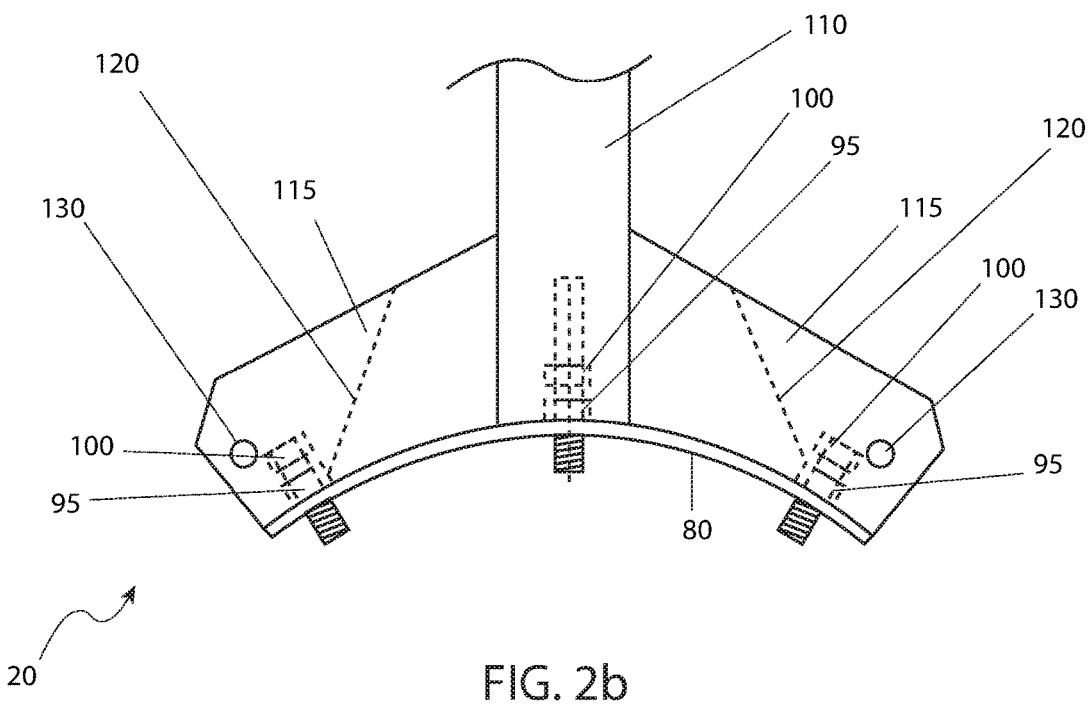
FIG. 2b is a top view of the tree jib plate of the disclosed large game carcass support aid, according to an embodiment of the present invention.

Referring to FIGS. 2*a* and 2*b*, in an example, the tree jib plate 20 includes a main base plate 80. In an example construction, the tree jib plate 20 is made of an aluminum plate with approximate dimensions of four by nine-and-a-half inches (4×9½ in.) and three-eighths of an inch (⅜ in.) thick. In an example, the main base plate 80 is rolled to six-and-three-quarters inch (6¾ in.) radius (FIG. 2*b*) with an eight-and-three-quarters inch (8¾ in.) overall width.

A main base bolt tab 85 (FIG. 2*a*) is connected (e.g., welded) to an approximate center of the main base plate 80. In an example construction, the main base bolt tab 85 has approximate dimensions of two by three-and-a-half inches (2×3½ in.) and three-eighths of an inch (⅜ in.) thick.

The tree jib plate 20 includes a plurality of holes 90, for example, three (3) holes 90, such as, two (2) holes in the main base plate 80 and one (1) hole in the main base bolt tab 85. In an example construction, the holes 90 are approximately thirteen-sixteenths of an inch (⅙ in.) in diameter. A plurality of nuts 95, for example, three (3) nuts 95 each being three-quarters of an inch (¾ in.) and made of aluminum, are connected (e.g., welded) to the tree jib plate 20 in place over the holes 90. A plurality of (e.g., three (3)) adjustment bolts 100 of a corresponding size are connected to the tree jib plate 20 by extending through the holes 90 and engaging the nuts 95.

The tree jib plate 20 also includes a plurality of (e.g., two (2)) first temporary attachment holes 105 in an upper portion of the main base plate 80, which are used during the initial placement of the tree jib plate 20 upon the tree 15 (FIG. 1). The first temporary attachment holes 105 are used with small screws or nails and inflict minimal or no damage to the tree 15 and are thus environmentally friendly.

A base boom 110 (hidden and shown by broken lines in FIG. 2*a*) projects perpendicularly to the main base plate 80 and is connected (e.g., welded) into place. In an example construction, the base boom 110 is approximately forty-eight inches (48 in.) long and made of two-and-a-half inch (2½ in.) square tube stock with a sidewall thickness of one-quarter inch (¼ in.).

The tree jib plate 20 also includes a plurality of (e.g., two (2)) first strap anchors 115 (partially hidden and shown by broken lines in FIG. 2a). In an example construction, the first strap anchors 115 are approximately two by four inches (2×4 in.) and three-eighths of an inch (⅜ in.) thick.

The tree jib plate 20 also includes a plurality of (e.g., two (2)) bolt gussets 120 (hidden and shown by broken lines in FIGS. 2a and 2b). In an example construction, the bolt gussets 120 are approximately two by three-and-a-half inches (2×3½ in.) and three-eighths of an inch (⅜ in.) thick.

The tree jib plate 20 also includes a bolt tab gusset 125 (hidden and shown by broken lines in FIG. 2a). In an example construction, the bolt tab gusset 125 is approximately two by three-and-a-half inches (2×3½ in.) and three-eighths of an inch (⅜ in.) thick.

FIG. 2b more clearly shows the projecting nature of the base boom 110 form the main base plate 80, the supporting nature of the first strap anchors 115, and the bolt gussets 120 (hidden and shown by broken lines). The three (3) nuts 95 and the adjustment bolts 100 are also more clearly shown.

The tree jib plate 20 also includes a plurality (e.g., two (2)) tree jib plate ratchet strap attachment holes 130 (FIG. 2b) formed through the first strap anchors 115. In an example construction, the tree jib plate ratchet strap attachment holes 130 are approximately one-half of an inch (½ in) in diameter. The tree jib plate ratchet strap attachment holes 130 are used to attach the tree jib plate ratchet strap 35 (FIG. 1) and hold the tree jib plate 20 securely to the tree 15 (FIG. 1).

Figure 3A:
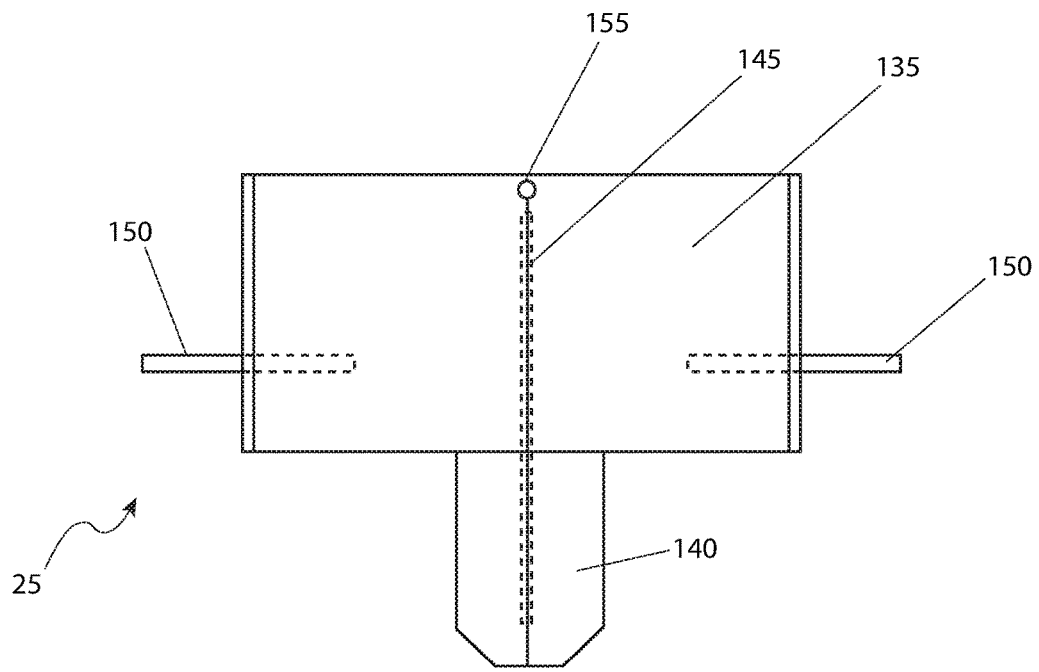
FIG. 3a is a front view of a truss plate of the disclosed large game carcass support aid, according to an embodiment of the present invention.
Figure 3B:
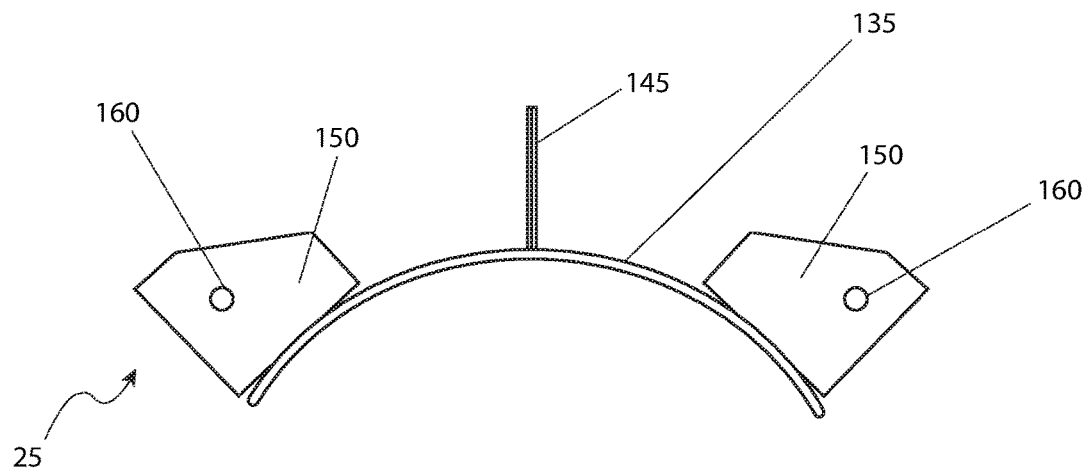
FIG. 3b is a top view of the truss plate of the disclosed large game carcass support aid, according to an embodiment of the present invention; and, FIG. 4 is a side view of a tree jib boom of the disclosed large game carcass support aid, according to an embodiment of the present invention.

Referring to FIGS. 3a and 3b, in an example, the truss plate 25 includes a main truss plate 135. In an example construction, the main truss plate 135 is made of an aluminum plate with approximate dimensions of four by nine-and-a-half inches (4×9½ in.) and three-eighths of an inch (⅜ in.) thick. In an example, the main truss plate 135 is rolled to four-and-three-quarters inch (4¾ in.) radius with an eight inch (8 in.) overall width.

The main truss plate 135 includes a truss support tab 140 that is connected (e.g., welded) to an approximate center of the main truss plate 135. In an example construction, the truss support tab 140 has approximate dimensions of two by three inches (2×3 in.) and three-eighths of an inch (⅜ in.) thick.

The main truss plate 135 includes a bolt tab gusset 145 (hidden and shown by broken lines in FIG. 3a). In an example construction, the bolt tab gusset 145 has approximate dimensions of two by six inches (2×6 in.) and three-eighths of an inch (⅜ in.) thick.

The truss plate 25 includes a hole (not shown in FIGS. 3a and 3b due to illustrative limitations) formed through the bolt tab gusset. In an example construction, the hole is approximately one-half inch (½ in.) diameter. The hole is used to connect the upper end of the tree jib boom support ratchet strap 45 (FIG. 1).

The main truss plate 135 also includes a plurality of (e.g., two (2)) second strap anchors 150 (partially hidden and shown by broken lines in FIG. 3a). In an example construction, the second strap anchors 150 have approximate dimensions of two by two-and-a-half inches (2×2½ in.) and three-eighths of an inch (⅜ in.) thick.

The truss plate 25 also includes a second temporary attachment hole 155 in an upper portion of the main truss plate 135, which is used during the initial placement of the truss plate 25 upon the tree 15 (FIG. 1). The second temporary attachment hole 155 is used with a small screw or nail and inflicts minimal or no damage to the tree 15 and is thus environmentally friendly.

FIG. 3b more clearly shows the main truss plate 135, the forward jutting nature of the bolt tab gusset 145, and the supporting nature of the two (2) second strap anchors 150.

The truss plate 25 also includes a truss plate ratchet strap attachment holes 160 (FIG. 3b) formed through the second strap anchors 150. In an example construction, the truss plate ratchet strap attachment holes 160 are approximately one-half of an inch (½ in) in diameter. The truss plate ratchet strap attachment holes 160 are used to attach the truss plate ratchet strap 40 (FIG. 1) and hold the truss plate 25 securely to the tree 15 (FIG. 1).

Figure 4:
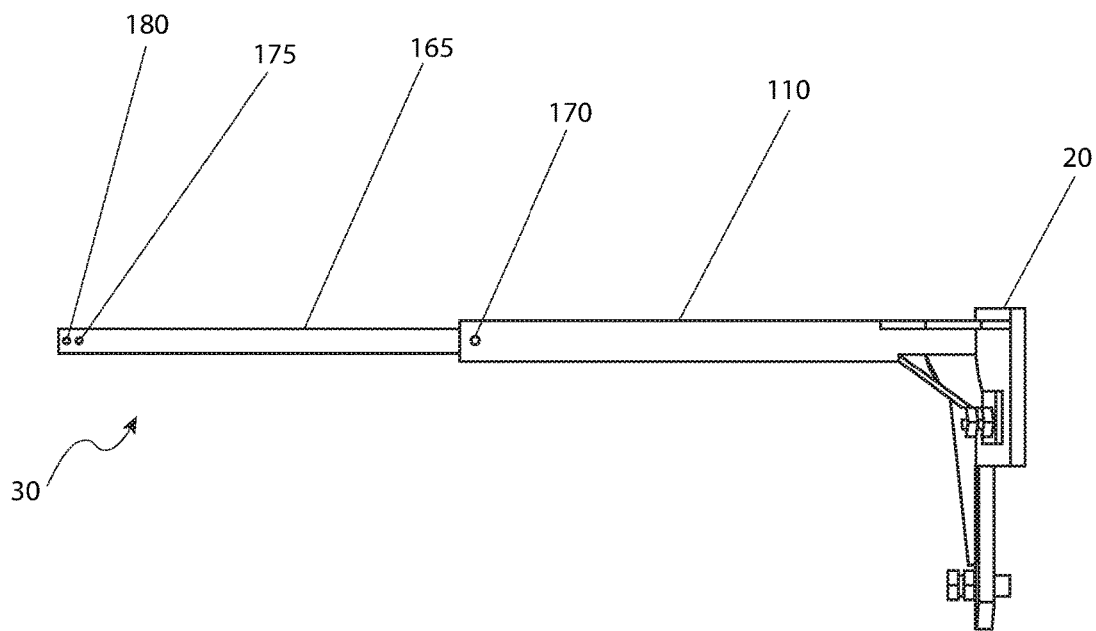

Referring to FIG. 4, in an example, the tree jib boom 30 includes the base boom 110, which is connected to the tree jib plate 20. The tree jib boom 30 also includes a boom extension 165 connected to the base boom 110 and located on the opposite end of the base boom 110 from the tree jib plate 20. In an example construction the boom extension 165 is approximately fifty-two inches (52 in.) long and made of one-half inch (½ in.) square tube stock with a sidewall thickness of one-quarter inch (¼ in.).

The tree jib boom 30 also includes a first connection hole 170 in the base boom 110 that matches with one of a plurality of second connection holes 175 (the one second connection hole 175 is not visible in FIG. 4 due to illustrative limitations) in the boom extension 165 and is connected with a fastener of suitable strength. In an example, one of the second connection holes 175 is located at one end of the boom extension 165 and another one of the second connection holes 175 is located at the other end of the boom extension 165. In another example, the boom extension 165 includes additional second connection holes 175 that mate with the first connection hole 170 to allow for adjustment of the overall length of the tree jib boom 30. In an example construction, the overall minimum and maximum dimensions of the tree jib boom 30 are fifty-four inches (54 in.) to eighty-four inches (84 in.), respectively.

The tree jib boom 30 also includes a third connection hole 180 in the boom extension 165 that provides for the connection of the opposite end of the tree jib boom support ratchet strap 45 (FIG. 1), while the second connection hole 175 provides for the connection of the snatch block 50 (FIG. 1).

In an example, the second connection hole 175 may also double as a lock hole when the boom extension 165 is in a collapsed position.

While not explicitly identified, the apparatus 10 may also include various other miscellaneous hardware, such as, but not limited to: bolts, washers, spacers, nuts, pins, jib base strap brackets, steel sleeve spacers, truss strap brackets, steel sleeve spacers, extension boom snatch block brackets, and the like, which may be utilized in various configurations to provide for ease of attachment, alignment, functionality, and the like.

In example implementations of a disclosed method of use, the disclosed apparatus 10 can be utilized in a simple and effortless manner with little or no training. It is envisioned that the apparatus 10 would be constructed, installed and utilized in general accordance with FIGS. 1-4.

In an example method, after procurement of the apparatus 10, the apparatus 10 is easily configured and utilized by one person in the following sequence: (1) Selecting appropriate diameter healthy tree 15 near the edge of an open area with reasonable access. A large game animal 60, such as an elk or moose may require tree 15 at least sixteen inches (16 in.) in diameter. A smaller large game animal 60, such as a deer, may require the tree 15 of at least twelve inches (12 in.) in diameter. (2) With the use of a tree ladder or other suitable climbing apparatus, placing the tree jib plate 20 approximately twelve to fourteen feet (12-14 ft.) above grade 75, for example, for an elk or moose, or approximately eight to ten feet (8-10 ft.), for example, for a deer, with the base boom 110 pointing towards an open area for access. The tree jib plate 20 is initially held in place with the use of a fastener, such as a screw or nail, through each of the two (2) first temporary attachment holes 105. (3) Placing the main truss plate 135 approximately thirty inches (30 in.) directly above and in-line with the tree jib plate 20. The main truss plate 135 is held in place temporarily with use of a fastener, such as a screw or nail, through the second temporary attachment hole 155. (4) Moving the tree ladder or other suitable climbing apparatus to the opposite side of the tree 15 and securing the tree jib plate 20 with the tree jib plate ratchet strap 35 by placing hooks of the tree jib plate ratchet strap 35 in the tree jib plate ratchet strap attachment holes 130 and ratcheting the tree jib plate ratchet strap 35 tightly. (5) Securing the truss plate 25 with the truss plate ratchet strap 40 with hooks of the truss plate ratchet strap 40 connected to the truss plate ratchet strap attachment holes 160 and ratcheting the truss plate ratchet strap 40 tightly. The fasteners placed in the first temporary attachment holes 105 and the second temporary attachment hole 155 can then be removed. (6) Connecting an upper end of the tree jib boom support ratchet strap 45 to the hole in the bolt tab gusset 145 and connecting a lower end of the tree jib boom support ratchet strap 45 to the third connection hole 180 in the boom extension 165. The tree jib boom support ratchet strap 45 is then adjusted (tightened) so the distal end of the boom extension 165 is elevated approximately two inches (2 in.) from horizontal. (7) Adjusting the adjustment bolts 100 (e.g., tightening or loosening) against the tree 15 so that the base boom 110 and boom extension 165 is nearly level or slightly elevated at the distal end. (8) Adjusting the overall length of the boom extension 165 using the first connection hole 170 and connecting the snatch block 50 to the third connection hole 180. (9) Securing the lifting cable 55 from the powered lifting device 70, through the snatch block 50, and terminated at the gambrel 65. (10) Lifting the large game animal 60 with the use of the powered lifting device 70 ensuring that the pulling or lift tension is always applied directly in line with the base boom 110 and boom extension 165.

When finished with use, the above process is reversed to disassemble and remove the apparatus 10.

The apparatus 10 is easily contained in a storage bag that is easy to move and store. It is envisioned that the overall weight of all components of the apparatus 10 would be approximately twenty-five pounds (25 lbs) allowing for easy transport by one (1) person.

The exact specifications, materials used, and method of use may vary upon manufacturing. The foregoing descriptions of specific embodiments have been presented for purposes of illustration and description. They are not intended to be exhaustive or to limit to the precise forms disclosed and many modifications and variations are possible in light of the above teachings. The embodiments were chosen and described in order to best explain principles and practical application to enable others skilled in the art to best utilize the various embodiments with various modifications as are suited to the particular use contemplate.

What is claimed is:

1. A game carcass support apparatus, comprising:
    a tree jib plate configured to be secured to a tree comprising:
        a main base plate;
        a main base bolt tab affixed to a center of the main base plate;
        at least one first temporary attachment hole provided in an upper portion of the main base plate;
        a base boom projecting perpendicularly into the main base plate and affixed thereto;
        two first strap anchors;
        two bolt gussets;
        a bolt tab gusset and,
        two ratchet strap attachment holes;
    a truss plate configured to be secured to the tree superjacent the tree jib plate comprising:
        a main truss plate;
        a truss support tab affixed to a center of the main truss plate;
        a bolt tab gusset capable of attachment to the tree jib boom;
        two second strap anchors; and,
        at least one second temporary attachment hole provided in an upper portion of the main truss plate;
    a tree jib boom, having a distal end adjustably attached to the truss plate; and,
    wherein the apparatus is capable of supporting a snatch block, a lifting cable, and a gambrel supporting a carcass thereon; and,
    wherein the tree jib boom comprises a boom extension removably and adjustably attached to the base boom.

2. The apparatus of claim 1, wherein the apparatus is further capable of supporting a hanging scale thereon.

3. A game carcass support apparatus, comprising:
    a tree jib plate securable to a tree comprising:
        a main base plate; and,
        first strap anchors connected to the main base plate;
        a plurality of adjustment bolts connected to the main base plate and the main base bolt tab, and wherein rotation of each one of the plurality of adjustment bolts adjusts an orientation of the tree jib plate relative to the tree; and,
        a tree jib plate ratchet strap configured to partially circumferentially extend around the tree and to be connected to the first strap anchors;
    a truss plate securable to the tree superjacent to the tree jib plate;
    a tree jib boom connected to the tree jib plate and connectable to the truss plate; and,
    a tree jib boom support ratchet strap connected to the truss plate and the tree jib boom;
    wherein:
        a snatch block is connected to the tree jib boom;
        a lifting cable is operatively connected to the snatch block;
        a gambrel is connected to one end of the lifting cable; and
        a carcass is mounted on the gambrel;
    wherein the tree jib boom is connected to the main base plate and the first strap anchors and projects perpendicularly from the main base plate;
    wherein the tree jib plate further comprises a main base bolt tab connected to the main base plate and extending perpendicularly from the main base plate and the tree jib boom;

wherein the main base plate has a curved profile shape configured to partially circumferentially extend around the tree; and, wherein the tree jib boom comprises:
 a base boom connected to the to the truss plate;
 a boom extension connected to the base boom; and,
 wherein the boom extension is movable relative to the base boom to adjust an overall length of the tree jib boom.

4. The apparatus of claim 3, wherein the truss plate comprises:
 a main truss plate; and,
 second strap anchors connected to the main truss plate.

5. The apparatus of claim 4, further comprising a truss plate ratchet strap configured to partially circumferentially extend around the tree and to be connected to the second strap anchors.

6. The apparatus of claim 5, wherein the main truss plate has a curved profile shape configured to partially circumferentially extend around the tree.

7. A game carcass support apparatus, comprising:
 a tree jib plate securable to a tree;
 a truss plate securable to the tree superjacent to the tree jib plate;
 a tree jib boom connected to the tree jib plate and connectable to the truss plate;
 a snatch block connected to the tree jib boom;
 a lifting cable operatively connected to the snatch block;
 a gambrel connected to one end of the lifting cable;
 a tree jib plate ratchet strap configured to partially circumferentially extend around the tree and to be connected to the tree jib plate;
 a truss plate ratchet strap configured to partially circumferentially extend around the tree and to be connected to the truss plate; and,
 a tree jib boom support ratchet strap connected to the truss plate and the tree jib boom, wherein a carcass is mountable on the gambrel; and,
wherein:
 the tree jib plate has a curved profile shape configured to partially circumferentially extend around the tree;
 the truss plate has a curved profile shape configured to partially circumferentially extend around the tree;
 the tree jib boom extends perpendicularly from the truss plate;
 the tree jib plate comprises a plurality of adjustment bolts; and,
 rotation of each one of the plurality of adjustment bolts relative to the tree jib plate adjusts an orientation of the tree jib boom relative to the tree.

* * * * *